Figure 1:
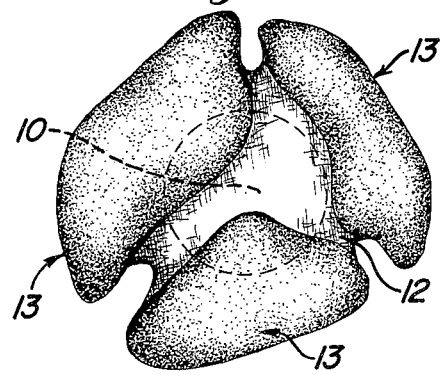

Oct. 24, 1961   D. E. VIERLING   3,005,753
PHENOTHIAZINE ANIMAL FEED COMPOSITION
Original Filed Nov. 20, 1956

INVENTOR
DONALD E. VIERLING
BY Robert U. Geib, Jr.
ATTORNEY

United States Patent Office 3,005,753
Patented Oct. 24, 1961

3,005,753
PHENOTHIAZINE ANIMAL FEED
COMPOSITION
Donald E. Vierling, 4594 Doverdell Drive,
Pittsburgh, Pa.
Continuation of application Ser. No. 623,439, Nov. 20,
1956. This application Dec. 16, 1958, Ser. No.
780,813
4 Claims. (Cl. 167—53)

This invention relates to a therapeutic composition, and more particularly to a medicated feed composition for animals, such as cattle, containing phenothiazine.

Phenothiazine is, of course, a very well known anthelmintic or dewormer for livestock, its use having been initiated approximately twenty (20) years ago by the Department of Agriculture of the United States.

This discovery of phenothiazine as an anthelmintic was the result of attempts to alleviate a terrific parasite problem in sheep which was nation-wide. Numerous chemicals were tried before phenothiazine was found to be an excellent dewormer for parasites in sheep.

With this discovery, there arose the problem of administering the full therapeutic dose of phenolthiazine to the sheep to be treated. After numerous tests, it was found that, so far as sheep were concerned, a full therapeutic dose of phenothiazine was 25 grams per adult animal. In order to administer such a quantity of phenothiazine to the animal, it was first proposed to form a large pill or bolus (or similar compacted mass) of phenothiazine and to force this mass into the stomach of the animals through the mouth. In the early stages, this large pill or bolus was coated with grease and pushed into the animal's mouth by hand and thence into the throat and stomach. Later, a balling gun was developed to shoot these pills down the animal's throat.

Aside from these difficulties, it was, of course, necessary to round up the animals prior to treatment. As will be readily appreciated, the aforementioned activities require considerable work and time. In the case of sheep, once they are rounded up and placed in position for treatment, they tend to become mesmerized, and the administration by hand is not, of itself, very difficult.

Although the administration to sheep of phenothiazine in the pill form was fairly satisfactory into the early 1940's, it was then proposed to make the phenothiazine in the form of a drench slurry. This method comprises placing bentonite clay in a given amount of water and then mixing in the phenothiazine with agitation until there is obtained a liquid having the consistency of pea soup and containing approximately 12½ grams of phenothiazine per fluid ounce. This phenolthiazine drench slurry is then drawn up into a syringe-type apparatus known as a drenching gun; and the outlet of the gun is placed in the animal's throat manually and the drench slurry forced into the animal's stomach. Thus, the use of phenothiazine drench slurry facilitated the manual administration of phenothiazine to sheep and made it a somewhat easier operation.

In addition to administering the full therapeutic dose of phenothiazine to sheep, the common practice in the early 1940's was to maintain before the sheep to be treated a phenothiazine salt mixture containing approximately 10% by weight of phenothiazine. This is usually referred to as the "low level self-administered dosage" of phenothiazine; and through it, there is administered approximately ¼ to 1 gram of phenothiazine per animal per day. The general practice was to give the sheep a full therapeutic dose two to four times a year and keep the phenothiazine salt mixture before them at all times. This method of controlling parasites proved to be very effective in sheep.

In the late 1940's, it was found that there was also a very serious nation-wide internal parasite problem with cattle. Again, various drugs were tested; and it was found that phenothiazine was best suited.

In order to get the cattle deworming program under way, the phenothiazine drench slurry was used as the source of the anthelmintic. In order to administer the slurry, it was necessary to round up the cattle and manually force the slurry into them. However, the manual administration of phenothiazine drench slurry to cattle presents a decidedly more complex problem than does its manual administration to sheep. After the animals were placed in the pens, it was necessary to put each one in a chute and have a team of four to six men hold its head, open its mouth, and manually force the phenothiazine drench slurry into its stomach. Not only were these activities arduous and hazardous, but the very act of rounding up of the animals placed them under a severe tension, followed by a tendency to go off feed, with the result that they lost weight and were subject to additional diseases. Under normal conditions, the phenothiazine drench slurry had to be administered two to four times a year.

Due to the aforementioned difficulties, the actual use of phenothiazine drench slurry in cattle was relatively small and limited mainly to animals in the last stages of parasitic condition wherein they were so weak and run down that it was relatively easy to round them up and administer the phenothiazine to them. Manifestly, this is the worst possible stage in which to administer the anthelmintic, the recommended practice being, of course, to treat the animals while they are healthy, thereby enabling the internal parasites to be kept at a minimum. Once the internal parasite load is permitted to build up to a large scale, it is often impossible to save the animal even though the parasites are eliminated by treatment. In other words, the animal frequently is in such a weakened condition, that it will not survive regardless of the manner in which it is treated.

Confronted with the aforementioned problems, applicant attempted to develop a method of administering phenothiazine to cattle by "self-administration," or having them ingest it through their own free choice. This proved to be a very difficult task, as cattle have a very strong distaste for phenothiazine and, under normal conditions, will not eat it when it is mixed in with palatable feeds or other forms. With this in mind, applicant and his associates conducted numerous experiments at their experimental farm to discover a palatable form of phenothiazine that could be given to the cattle in the full therapeutic dose in their regular feed regimen.

Early in these experiments, it was determined that there must be formulated a palatable form of phenothiazine which would readily be eaten by the animal in a short period of time, say within an hour or so. This is due to the fact that, when cattle regurgitate their feed, they could taste the phenothiazine; and even though they could not reject this particular batch of feed, they would recall its unpleasant characteristics to such an extent that they would not eat a similar batch of material for a period of two to three weeks. However, since the animals had to be given the full therapeutic dosage at the most only four times a year, it was realized that the problem would be solved if the full therapeutic dose could be administered before they regurgitated.

The difficulties referred to hereinbefore are avoided by the treated phenothiazine compositions of the present invention, for not only is the phenothiazine rendered more desirable and palatable to the host animal, but also it is consumed by the animal in truly therapeutic amounts. At the same time, the therapeutic efficacy is maintained.

The improved composition of the present invention comprises particulate phenothiazine, practically each particle of which is enveloped to a very substantial extent with a palatable flavoring media. The purpose of the aforementioned flavoring media is, of course, to mask the objectionable odor and taste of the phenothiazine particles to the host animal. Not only must the particular flavoring media used be selected with care (for it must itself be extremely palatable to the host animal), but the amount used and the surface area of the individual phenothiazine particles coated therewith are critical if the animal is to be induced to consume the same in truly therapeutic amounts.

In mixing finely-comminuated phenothiazine, flavored or unflavored, two main problems arise. First of all, the finely-comminuated phenothiazine particles are so light and fluffy that they present a dust problem. This phenothiazine dust disperses in the general atmosphere in which the mixing takes place and burns the skin of workmen and discolors objects with which it comes in contact. In the second place, the phenothiazine particles are so small (for example, they may have an average particle size of about 10 microns) that it is extremely difficult to obtain a homogeneous mixture with livestock regimen, such as feeds, salt, and mineral supplements, each of which may average around 300 microns in size. But even after a mixture is obtained, the phenothiazine particles, being so much smaller than the livestock regimen, such as feeds, salt and mineral supplements associated therewith, tend to settle out during transit and handling. This means, of course, that the anthelmintic, phenothiazine, is unevenly distributed in the mixture and results in unequal dosages of undetermined amounts of phenothiazine being administered to the livestock.

It is among the objects of the present invention to avoid the aforementioned difficulties by providing a novel and highly effective composition comprising phenothiazine particles which carry two discrete coatings, the outer of which comprises a palatable, agglomerating, adhesive agent to which livestock regimen is attached.

Figure 2:
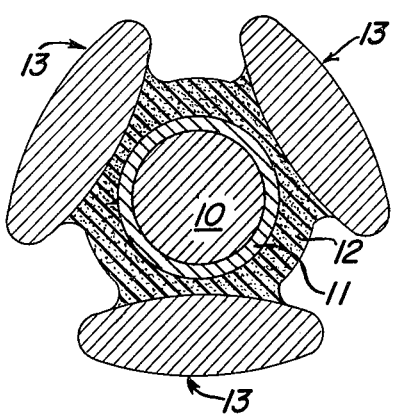

The foregoing and other objects will be more readily understood after referring to the following specification and annexed drawings, in which:

FIGURE 1 is a plan view illustrating, in greatly enlarged form, a phenothiazine particle which has been treated in accordance with the teachings of the present invention; and FIGURE 2 is a sectional view, also in greatly enlarged form, and illustrating more clearly both of the coatings referred to, and which will be specifically described hereinafter.

In these figures, the numeral 10 generally indicates the phenothiazine particle, the same being provided with an initial flavoring coating 11. Around the flavoring coating 11, there is a discrete palatable, agglomerating, adhesive coating 12, and finally a coating of livestock regimen 13.

When practicing the present invention, the size of the phenothiazine particles is not critical, although they should be such that they can easily be made to carry the initial flavor coating and the palatable, agglomerating, adhesive agent 12 which provides a surface to which the livestock regimen (such as ground feed, salt, or mineral supplements) can adhere. In general, the average particle size of the phenothiazine should be at least one micron, preferably about 5 to about 25 microns.

As to the agglomerating agent, any palatable (to animals) compound or mixture of compounds which will readily coat phenothiazine particles and which will form a sufficiently strong base for adherence of livestock regimen thereto will suffice. Examples of some palatable, agglomerating, adhesive coatings which may be satisfactorily used to practice the teachings of the present invention are corn syrup, lecithin, molasses, cane syrup, etc. The palatable, agglomerating agent must possess sufficient adhering characteristics and the coating must be thick enough to allow the livestock regimen to attach itself thereto until the composition is finally consumed by the host animal. I have discovered that it is absolutely necessary that at least about 50 percent, and preferably about 60 to about 100 percent, of the surface of the individual phenothiazine particle be coated with such agent, and that the thickness of the coating be at least about one micron, and preferably about 2 to about 5 microns. This means that, based on the weight of the phenothiazine particles, the amount of agent which is necessary is at least about 20 percent, preferably about 40 to about 100 percent by weight.

As previously stated, the teachings of the present invention include such livestock regimen as feeds, salt, or mineral supplement which are generally administered for a particular purpose to animals, such as beef cattle. Also, some of the livestock regimen which may be used include soybean meal, ground corn, ground oats, ground wheat, cotton seed meal, ground alfalfa, ground forage, ground rye, ground barley, etc. While the particle size of these substances (i.e., livestock regimen) is not critical, they should have an average particle size of at least about 50 microns, preferably about 100 to about 400 microns. The amount of these substances present in the final composition is also not critical; but should usually be at least about 15 percent by weight, and preferably about 20 to about 45 percent by weight.

While the foregoing phenothiazine composition is excellent for administering the low-level therapy of phenothiazine to livestock (for example, in the case of beef cattle, one to two grams of phenothiazine per animal per day), the phenothiazine should be coated with a flavoring medium in accordance with the procedure set forth in my patent applications Serial Nos. 623,319 and 623,439 (both of which were filed on November 20, 1956) prior to coating with the palatable, agglomerating, adhesive coating, in order to administer to cattle the full therapeutic dose of phenothiazine (for example, in the case of adult beef cattle, 60 grams of phenothiazine per animal administered over a twenty-four hour period). Briefly stated, this procedure as practiced in the present invention comprises initially coating the individual phenothiazine particles over at least about 30 percent of their respective surface, and preferably about 50 to about 80 percent thereof, with one or more of the following agents: anise, anethole, sesame, eucalyptus, chenopodium, fenugreek, ginger, imitation alfalfa flavor, corn syrup, imitation hay flavor, licorice, licorice root powder, malt, molasses, noncaloric sweeting agents, such as cyclohexylsulfamate (sodium or calcium), sugar, etc. The amount of coating used relative to the phenothiazine is at least about one percent, preferably about 5 to about 20 percent by weight. When so treated, the phenothiazine is consumed by the host animal in truly therapeutic amounts.

In preparing the composition of the present invention, any means may be utilized which will provide adequate contact between the individual agents forming the composition; for example, spraying apparatus, tumbling apparatus, etc.

In order to enable a better understanding of the present invention, certain examples are set forth hereinafter. Examples I, II and III illustrate the difficulties which are encountered when attempts are made to obtain a homogeneous mixture of phenothiazine and livestock regimen, such as feed, salt, and mineral supplements, without practicing the teachings of the present invention.

*Example I*

A phenothiazine-feed mixture was prepared by introducing into a standard one cubic foot conical blender one pound of phenothiazine NF powder having an average particle size of 10 microns and 99 pounds of a regular ground feed having an average particle size of 300 microns containing ⅓ part by weight of ground oats, ⅓ part by weight of ground corn, and ⅓ part by weight of ground wheat fortified with an additional 10 percent by weight of blackstrap molasses. The conical blender was rotated at 15 r.p.m. at atmospheric pressure and atmospheric temperature for 30 minutes. During the loading, mixing, and unloading operation, dust samples were taken; and it was ascertained that the phenothiazine particles travelled in a radius of about 86 feet from the point where the phenothiazine was carefully introduced (to minimize dusting action) in the blender. Workmen introducing the phenothiazine into the blender were well covered with phenothiazine and would have suffered skin burns if they had not removed the phenothiazine dust by washing with soap and water immediately, since, if not removed, phenothiazine dehydrates the human skin and produces a burn. Moreover, paper bags and cartons within a 59-foot radius of the blender were discolored an off-color pink through the action of the phenothiazine which came in contact therewith.

After thorough mixing, spot samples were taken to make absolutely certain that the mixture uniformly contained one part by weight of phenothiazine and 99 parts by weight of the ground feed. Fifty pounds of this uniformly-mixed phenothiazine-feed were placed in a regular bag and sealed. The bag was then placed in a truck and transported over regular hard surface roads for 37 miles. The fifty-pound bag containing phenothiazine and feed was opened, and samples were taken and analyzed as follows:

| Sample | Percent Phenothiazine Present |
|---|---|
| Sample No. 1 (One pound of phenothiazine feed mixture taken from the top fifth of the bag) | 0.42 |
| Sample No. 2 (One pound of phenothiazine feed mixture taken from the next or second fifth of the bag) | 0.74 |
| Sample No. 3 (One pound of phenothiazine feed mixture taken from the third or next succeeding fifth of the bag) | 0.98 |
| Sample No. 4 (One pound of phenothiazine feed mixture taken from the fourth-from-the-top fifth of the bag) | 1.31 |
| Sample No. 5 (One pound of phenothiazine feed mixture taken from the bottom fifth of the bag) | 1.55 |

*Example II*

Additional tests were run in a manner identical to Example I, except that the ingredients making up the mixture consisted of 10 pounds of phenothiazine and 90 pounds of regular granulated agricultural salt with the following results:

Sample: Percent phenothiazine present
  No. 1 _____ 5.43
  No. 2 _____ 8.63
  No. 3 _____ 10.10
  No. 4 _____ 12.80
  No. 5 _____ 13.05

Again it was found that an objectionable dust problem was present within a radius of 78 feet of the mixing operation.

*Example III*

Additional tests were again run in a manner identical to Example I, except that the ingredients making up the mixture consisted of 10 pounds of phenothiazine and 90 pounds of mineral supplements comprising iron, copper and manganese in the form of sulphates, with the following results:

Sample: Percent phenothiazine present
  No. 1 _____ 5.08
  No. 2 _____ 7.62
  No. 3 _____ 9.97
  No. 4 _____ 13.06
  No. 5 _____ 14.27

This time, it was found that an objectionable dust problem was present within a radius of 82 feet of the mixing operation.

It is apparent from an observation of the above examples that mixing of finely-comminuted phenothiazine particles with livestock regimen, such as feed, salt, or mineral supplements, presents two serious problems.

First (and as before mentioned), the phenothiazine particles are so light and fluffy that, when they are poured into a mixer or blender to form the desired mixture, they tend to dissipate into the atmosphere and present a dust problem, not only as a health hazard to workmen, but also because of discoloration of objects within a wide range of the mixing operations. Secondly, the phenothiazine particles are so small in comparison with livestock regimen, such as feeds, salt, or mineral supplements, with which they are mixed (for example, about 10 microns for phenothiazine against 300 microns for the feeds, salt or mineral supplements admixed therewith) that they tend to sift to the bottom of the mixture under ordinary motions accompanying handling and ordinary transportation. This, of course, results in an unequal distribution of phenothiazine particles in the mixture and, consequently, unequal dosages of undetermined amounts of phenothiazine.

The following example comprises a formulation which to a certain extent overcomes the difficulties referred to hereinbefore so far as concerns the low-level therapy of phenothiazine.

*Example IV*

Fifty-three pounds of phenothiazine particles having an average particle size of 10 microns were placed in a one cubic foot conical blender as in Example I, and after the blending and tumbling operation was started, 22 pounds of corn syrup was sprayed over the tumbling phenothiazine particles over a period of 15 minutes. The conical blender was rotated after the spraying operation for a period of 30 minutes at 15 r.p.m. at atmospheric pressure and temperature. At the end of this period, it was found the average individual phenothiazine particle was coated over approximately 85 percent of its surface. At this point, 25 pounds of ground soybean meal having an average particle size of approximately 300 microns was added to the blender, and the blending and tumbling operation was continued for an additional 30 minutes as before. At the end of this additional period, the ground soybean meal became uniformly affixed to the coated phenothiazine particles.

The determination of the amount of surface of the phenothiazine particles which were coated with corn syrup was effected as follows: The corn syrup, prior to the operation, was colored with a distinguishing bright red colored dye (F & DC Red Dye No. 2). At the end of the operation wherein the phenothiazine particles were coated with corn syrup, the particles were removed and placed under a microscope to determine the percentage of the surface of the phenothiazine particle which was so coated.

The following Example V illustrates the fact that the amount of coating on the phenothiazine particle is critical:

*Example V*

A test similar to Example IV was carried out, except that the average individual phenothiazine particles were initially coated over 47 percent of their surface with corn syrup in accordance with the procedure set forth in Example I prior to admixture with the soybean meal. The results obtained were as follows:

Sample: Percent phenothiazine present
  No. 1 _____ 0.78
  No. 2 _____ 0.87
  No. 3 _____ 1.03
  No. 4 _____ 1.08
  No. 5 _____ 1.24

The amount of sifting obtained in this test is in excess of that which would be tolerated in commercial practice. In addition, it was found that paper bags and cartons within a radius of 6 feet of the conical blender were discolored an off-color pink because of the action of the phenothiazine powder. While this was an improvement over the results obtained in Example I, it was not entirely satisfactory.

The example set forth immediately hereinafter illustrates the decided advantages which are obtained by the present invention:

Example VI

A test similar to Example V was carried out, except that the average individual phenothiazine particle was coated with corn syrup to the extent of 52 percent; and the following results were obtained:

| Sample | Percent phenothiazine present |
|---|---|
| No. 1 | 1.02 |
| No. 2 | 1.00 |
| No. 3 | 1.01 |
| No. 4 | 0.96 |
| No. 5 | 1.01 |

From the immediate foregoing, it will be seen that there was no appreciable sifting of the phenothiazine particles through the mixture. The dusting conditions found at a radius of 59 feet in Example I only occurred in the present example (i.e., Example VI) at a distance of but 14 inches. At this short distance, there was no health hazard to the workmen, and there was no discoloration of surrounding materials as in the case of Example I.

Another illustration of the present invention immediately follows:

Example VII

An additional test similar to Example V was run, except that the average individual phenothiazine particles were coated with lecithin to the extent of 82 percent; and the following results were obtained:

| Sample: | Percent phenothiazine present |
|---|---|
| No. 1 | 1.02 |
| No. 2 | 0.98 |
| No. 3 | 1.00 |
| No. 4 | 0.99 |
| No. 5 | 1.01 |

The immediately foregoing example also demonstrates the fact that no appreciable sifting takes place with the present invention. The dusting conditions previously described were found to be present at a radius of but 12 inches of the mixing operation; and, at this short distance, there is no danger to the workmen and no occurrence of discoloration, as in the case of Example I.

Immediately following is still another illustration of the efficacy of the present invention:

Example VIII

Another test similar to Example V was carried out, except that the phenothiazine particles were coated with cane syrup to the extent of substantially 100 percent; and the following results were obtained:

| Sample: | Percent phenothiazine present |
|---|---|
| No. 1 | 1.01 |
| No. 2 | 0.99 |
| No. 3 | 1.00 |
| No. 4 | 0.99 |
| No. 5 | 1.01 |

The immediately foregoing results will be seen to compare with those obtained in Examples VI and VII. The dusting conditions previously described were found to exist only at a distance of 10 inches, which was obviously satisfactory.

The composition of Example VIII may easily be administered to animals to effect a low level dosage of phenothiazine (for example, in the case of beef cattle, 1 to 2 grams of phenothiazine per animal per day); and this is illustrated in the following example:

Example IX

A herd of eight beef cattle weighing an average of 650 pounds each were on good pasture. These animals had free access to a mineral supplement consisting of 33⅓ percent by weight bonemeal, 33⅓ percent by weight ground limestone and 33⅓ percent by weight salt, and were consuming an average of 25 grams of this mineral mix per animal per day. The phenothiazine composition manufactured per Example VIII was added to this mineral supplement in an amount of 20 percent by weight of the final phenothiazine-mineral supplement composition. This phenothiazine-mineral supplement was placed before these cattle; and, after thirty days, it was found that each animal had consumed sufficient of this medicated mineral supplement to ingest 2.2 grams of phenothiazine per animal per day.

Example IX amply demonstrates that the composition of the present invention is excellent for administering the low level therapy of phenothiazine to beef cattle. In order to provide the full therapeutic does of phenothiazine (for example, in the case of adult beef cattle, 60 grams of phenothiazine per animal administered over a 24-hour period), the composition of the present invention should be employed. In effect, this composition is similar to certain of the other compositions previously defined, except that the phenothiazine particles carry an intermediate layer or coating of a flavoring medium as mentioned hereinbefore. A method of preparing the novel composition is described immediately hereinafter.

Example X

Fifty-six pounds of phenothiazine having an average particle size of 10 microns and coated over 72 percent of its individual surfaces with a composition comprising 30 percent by weight fenugreek, 40 percent by weight anise, 15 percent by weight licorice, and 15 percent by weight imitation alfalfa flavor were placed in a one cubic foot conical blender; and after the blending and tumbling operation was started, 22 pounds of corn syrup was sprayed in a fine mist over a period of 15 minutes over the phenothiazine particles. The conical blender was rotated after the spraying operation for a period of 30 minutes at 15 r.p.m. at atmospheric pressure and temperature. At the end of this period, it was found the average individual phenothiazine particle was coated over approximately 84 percent of its surface. At this point, 22 pounds of ground soybeans meal having an average particle size of 300 microns were added to the blender; and the blending and tumbling operation was continued for an additional 30 minutes as before. At the end of this additional period, the ground soybean meal became uniformly affixed to the phenothiazine particles. The results of this example are graphically illustrated in FIGURE 2 of the drawings.

A number of additional tests were run in order to determine under what conditions the phenothiazine was dust free and did not sift out the mixture in transit or handling; and the results of some of these tests immediately follow.

Example XI

A test similar to Example X was carried out, except that the surface of each of the average individual phenothiazine particles was coated to the extent of 71 percent with a composition comprising 30 percent by weight fenugreek, 30 percent by weight anise, 15 percent by weight licorice and 15 percent by weight imitation alfalfa flavor; and the average individual subsequent surface was 45 percent coated with corn syrup; and the following results were obtained:

| Sample: | Percent phenothiazine present |
|---|---|
| No. 1 | 0.82 |
| No. 2 | 0.86 |
| No. 3 | 0.92 |
| No. 4 | 1.18 |
| No. 5 | 1.22 |

The amount of sifting of phenothiazine particles in the above test was more than could be tolerated in commercial practice. The dusting conditions found at a radius of 59 feet in Example I were found to exist at a radius of 7 feet. While this was an improvement, it was not satisfactory.

The benefits of the composition of the present invention are illustrated below in Example XII.

*Example XII*

A test similar to Example XI was run, except that the average individual phenothiazine particles were 60 percent coated with corn syrup. The results obtained are set forth below:

| Sample: | Percent phenothiazine present |
|---|---|
| No. 1 | 1.00 |
| No. 2 | 0.99 |
| No. 3 | 1.02 |
| No. 4 | 0.98 |
| No. 5 | 1.01 |

From previous discussions, it is obvious that the above distribution of phenothiazine particles in the mixture is satisfactory. The dusting conditions previously found to exist had been reduced to a radius of 12 inches from the blender. Obviously no hazard to workmen occurred and no discoloration to similar surrounding objects as in Example I was seen to exist.

The benefits to be derived from the composition of the present invention are further illustrated in the following example:

*Example XIII*

Another test similar to Example XI was run, except that the average individual phenothiazine particles were coated with corn syrup to the extent of substantially 100 percent; and the results obtained were as follows:

| Sample: | Percent phenothiazine present |
|---|---|
| No. 1 | 1.00 |
| No. 2 | 1.00 |
| No. 3 | 1.00 |
| No. 4 | 0.99 |
| No. 5 | 1.01 |

Again it is manifest that the distribution of the phenothiazine particles in the phenothiazine feed mix was satisfactory. The dusting conditions previously found to exist were reduced to an area of but 8 inches from the blender.

Immediately following is an example which illustrates that the preferred composition of this invention presents no difficulty in administering full therapeutic dosages of phenothiazine to beef cattle.

*Example XIV*

Six cattle weighing approximately 500 pounds each were grazing on six acres of good pasture; and were not being given any supplemental feed. One and a half pounds of the phenothiazine composition manufactured as per Example XIII was mixed with 15 pounds of regular ground feed consisting of 30 percent by weight ground oats, 40 percent by weight ground corn and 30 percent by weight ground wheat and placed before these animals. The cattle consumed all of this medicated feed within a twelve-hour period. Each cattle thus consumed an average of 60 grams of phenothiazine, which is the full therapeutic dose.

The present application is a continuation of my patent application Serial No. 623,439 filed November 20, 1956, entitled "Phenothiazine Composition," which is, in turn, a continuation-in-part of my patent application Serial No. 410,031 filed February 12, 1954, entitled "Phenothiazine Product and Method of Making the Same," now both abandoned.

Obviously, many modifications and variations of the invention as defined hereinabove can be made without departing from the spirit and scope thereof and, therefore, only such limitations should be imposed as are indicated in the appended claims.

I claim:

1. As a new composition of matter, phenothiazine particles carrying a flavoring coating which constitutes between about 1 percent to about 20 percent by weight of the coated particles and covers at least about 30 percent of the surface thereof; a palatable, agglomerating, adhesive coating of between about 1 micron to about 5 microns in thickness; said second-named coating covering at least about 50 percent of the previously coated phenothiazine particles; and livestock regimen disposed exteriorly of and attached to said second-named coating.

2. As a new composition of matter, phenothiazine particles carrying a flavoring coating which constitutes between about 1 percent to about 20 percent by weight of the coated particles and covers at least about 30 percent of the surface thereof; a palatable, agglomerating, adhesive coating of between about 1 micron to about 5 microns in thickness; said second-named coating covering from about 60 percent to about 100 percent of the previously coated phenothiazine particles; and livestock regimen disposed exteriorly of and attached to said second-named coating.

3. As a new composition of matter, phenothiazine particles carrying a flavoring coating which constitutes between about 1 percent to about 20 percent by weight of the coated particles and covers at least about 30 percent of the surface thereof; a palatable, agglomerating, adhesive coating of between about 1 micron to about 5 microns in thickness; said second-named coating comprising corn syrup and covering at least about 50 percent of the previously coated phenothiazine particles; and livestock regimen disposed exteriorly of and attached to said second-named coating.

4. As a new composition of matter, phenothiazine particles carrying a flavoring coating which constitutes between about 1 percent to about 20 percent by weight of the coated particles and covers at least about 30 percent of the surface thereof; a palatable, agglomerating, adhesive coating of between about 1 micron and about 5 microns in thickness; said second-named coating comprising corn syrup and covering from about 60 percent to about 100 percent of the previously coated phenothiazine particles; and livestock regimen disposed exteriorly of and attached to said second-named coating.

References Cited in the file of this patent

UNITED STATES PATENTS

| 2,439,532 | Whiting | Apr. 13, 1948 |
| 2,840,504 | Vierling | June 24, 1958 |

OTHER REFERENCES

McCullough: J. Am. Vet. Med. Assn., 101:785, pp. 114, 117, 118, 119, August 1942.